March 16, 1926.

A. J. HORTON 1,577,028

BATTERY CHARGING APPARATUS

Original Filed Jan. 17, 1920

INVENTOR.
Albert J. Horton
BY
Frank H. Hubbard
ATTORNEY

Patented Mar. 16, 1926.

1,577,028

UNITED STATES PATENT OFFICE.

ALBERT J. HORTON, OF WHITE PLAINS, NEW YORK, ASSIGNOR TO THE CUTLER-HAMMER MFG. CO., OF MILWAUKEE, WISCONSIN, A CORPORATION OF WISCONSIN.

BATTERY-CHARGING APPARATUS.

Application filed January 17, 1920, Serial No. 352,181. Renewed August 3, 1925.

*To all whom it may concern:*

Be it known that I, ALBERT J. HORTON, a citizen of the United States, residing at White Plains, in the county of Westchester and State of New York, have invented new and useful Improvements in Battery-Charging Apparatus, of which the following is a full, clear, concise, and exact description, reference being had to the accompanying drawing, forming a part of this specification.

This invention relates to charging apparatus for storage batteries, and while not limited thereto, is particularly applicable to charging apparatus for the batteries of electric vehicles.

Owing to the possibility of a heavy inrush of current upon connection of such batteries to a charging line, it has been found impracticable to complete the charging connections therefor by the coupling devices commonly employed to connect the terminals of the batteries and charging line and heretofore it has been the practice to complete the charging connections manually through the medium of a separate switch after coupling of the terminals. Thus where the charging apparatus is located inside of a building with connections to outlets in the street, whereby vehicles may be charged at the curb, such practice is very inconvenient.

The present invention has among its objects to provide charging apparatus for batteries employed in the aforesaid and other relations which will complete the charging connections automatically following coupling of the battery and line terminals.

Another object is to provide charging apparatus of the aforesaid character which will not require any modification of the present equipment of such electric vehicles and which will enable the use of circuit breakers for automatically stopping the charge as heretofore.

Another object is to provide charging apparatus adapted for use as a unit of sectional charging equipments.

Various other objects and advantages of the invention will hereinafter appear.

The accompanying drawing illustrates one embodiment of the invention which will now be described, it being understood that the invention may be embodied in other forms falling within the scope of the appended claims.

Figure 1:
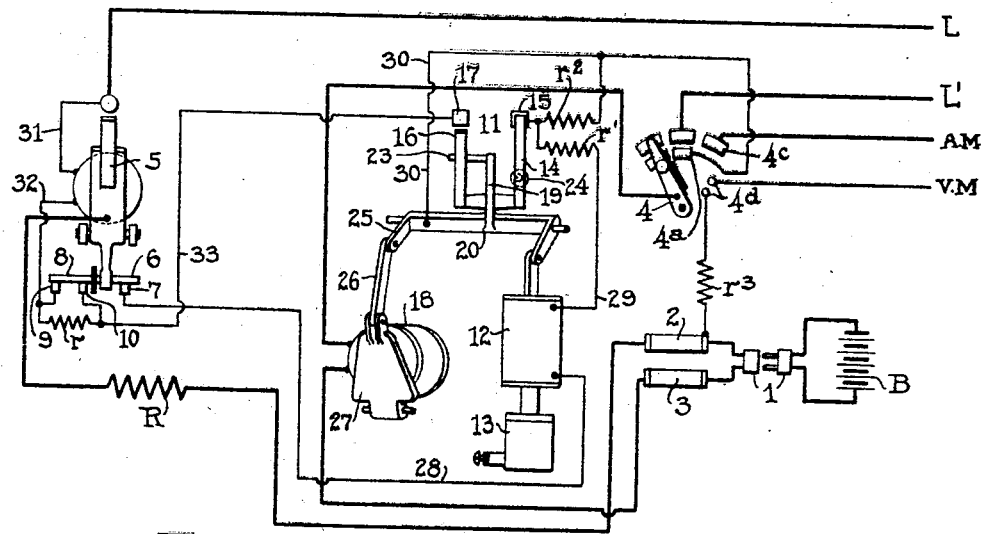
Figure 1 illustrates the apparatus diagrammatically.

Referring to Fig. 1, there is illustrated a battery B to be connected through a suitable coupling device 1 to a charging circuit L, L' having therein the usual fuses 2 and 3 and charging resistance R. A manual switch 4 is provided in one side of the charging circuit to interrupt the same at will and it may be assumed that the battery has associated therewith a circuit breaker such as is now commonly employed to interrupt the charging circuit when the battery is fully charged.

An electromagnetic switch 5 is provided for completing the charging circuit after closure of switch 4 and coupling of the battery and line terminals. This switch, which is preferably of the clapper type, is provided with an auxiliary contact 6 electrically connected to its clapper and adapted to normally engage a stationary contact 7. Also, said switch is provided with an insulated auxiliary contact 8 adapted to normally engage and bridge stationary contacts 9 and 10, the latter having connected therebetween a resistance $r$.

Figure 2:
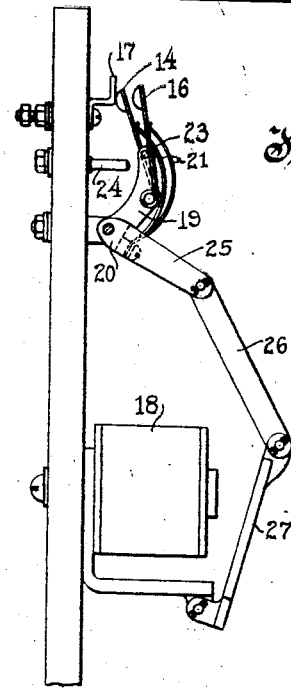
Fig. 2 illustrates a preferred form of relay for such apparatus.

A relay 11, having an operating solenoid 12, is provided to energize the main switch following coupling of the battery and line terminals, said solenoid having a dash pot 13 to afford a definite time element. This relay is provided with a contact arm 14 normally engaging a stationary contact 15 and a contact arm 16 adapted to engage a stationary contact 17, the arrangement being such that upon response of the solenoid the arm 14 is disengaged from contact 15 while the arm 16 is engaged with contact 17. As will appear, the solenoid 12 is de-energized upon response of the switch 5 and for holding the relay thereafter the same is provided with an electromagnet 18. While in practice the relay may assume any desired form it is preferably constructed as shown in Fig. 2. As shown in Fig. 2 both contact arms are pivotally supported on an arm 19 of a rock shaft 20 and are respectively biased towards their co-operating contacts by springs 21. The contact arm 16 is normally held out of engagement with its stationary contact by a stop 23 on the free end of arm 19 but is permitted to engage said contact when arm 19 is rocked towards the latter. The contact 14, on the other hand, normally engages its stationary contact but has a pin 24 arranged in the path thereof whereby it is disengaged from said contact when the arm 19 is moved towards the latter. The rock shaft is operable by the solenoid 12 in a well known manner and has an arm 25 connected by a link 26 to the armature 27 of electromagnet 18, whereby the shaft is locked against the back rotation when the electromagnet 18 is energized.

The circuit connections are such that when the switch 4 is placed in a vertical position the coupling device 1 serves to complete circuit from one terminal of the battery through fuse 2 and charging resistance R to the clapper of switch 5 and thence through its auxiliary contacts 6 and 7 by conductor 28 through the winding of solenoid 12, by conductor 29 through a resistance $r'$ to and through contacts 15 and 14 and rock shaft of relay 11, by conductor 30 to contact $4^a$ of switch 4, from which point the circuit extends through the winding of electromagnet 18, fuse 3 and coupling device 1 to the opposite terminal of the battery. Completion of this circuit effects response of the solenoid 12, which, after a given time determined by the dash pot 13, engages contacts 16 and 17 to complete the circuit of switch 5. This circuit may be traced from line L by conductor 31 through the winding of switch 5, by conductor 32 through the auxiliary contacts 9, 8 and 10 of said switch, by conductor 33 through contacts 17 and 16 of relay 11, by conductor 30 to contact $4^a$ of switch 4 and thence through the arm of said switch to line L'. Switch 5 being thus energized by current from the charging circuit responds to complete the charging connections which, being designated by heavy lines, are obvious without a description thereof.

Relay 11 in responding also disengages its contacts 14 and 15 to insert a resistance $r^2$ in series with its operating winding, while the switch 5 in responding also functions through disengagement of contact 8 from contacts 9 and 10 to insert a resistance $r$ in series with its winding. Further, the switch 5 in responding disengages its auxiliary contact 6 from contact 7 thereby interrupting the circuit of solenoid 12. In the meantime, however, the electromagnet 18 is energized by the current flowing in the charging circuit to hold the relay 11 against release.

It will thus be observed that provision is made for automatically completing the charging connections upon engaging the parts of the coupling device 1 but that the current initially passing through the coupling device is limited to a safe value regardless of the condition of the battery. Also, it will be observed that failure of the charging current will de-energize electromagnet 18, thus releasing the relay 11 and thereby de-energizing switch 5, and that accordingly said relay and switch will be de-energized upon interruption of the charging connections either by the manual switch 4 or by a circuit associated with the battery as heretofore.

The apparatus shown constitutes a unit for sectional charging equipment and the switch 4 thereof is provided with auxiliary contacts $4^c$ and $4^d$ to be respectively engaged by contacts on the arm 4 to establish ammeter and voltmeter connections. Also, the voltmeter connections have included therein a resistance $r^3$ to prevent cross currents between the battery B and any other battery connected to the voltmeter simultaneously therewith.

What I claim as new and desire to secure by Letters Patent is:

1. In combination a storage battery, a charging circuit therefor, a device for coupling the terminals thereof, means for normally interrupting said circuit and for completing said circuit automatically upon coupling of said battery thereto, said means including an electro-responsive device having an operating winding to be subjected by said coupling device to current from said battery to individually effect response thereof, means for delaying operation of said electro-responsive device, and means for de-energizing said winding upon response of said device.

2. In combination, a storage battery, a charging circuit therefor, a device for coupling the terminals thereof, means for normally interrupting said circuit and for completing said circuit automatically upon coupling of said battery thereto, said means including an electro-responsive device having operating and holding windings, the former to be subjected by said coupling device to current from said battery to individually effect operation of said device and the latter being included in said charging circuit and means for delaying operation of said electro-responsive device.

3. In combination, a storage battery, a charging circuit therefor, a device for coupling the terminals thereof and electro-responsive means normally interrupting said charging circuit and responsive to complete said circuit upon coupling of the battery thereto, said means being initially subjected by said coupling device to current from said battery and thereafter being subjected to current from said charging circuit, the supply of current from said battery to said means being terminated by response thereof.

4. In combination, a storage battery, a charging circuit therefor, a device for coupling the terminals thereof and electro-responsive means normally interrupting said charging circuit and responsive to complete said circuit upon coupling of the battery thereto, said means having a plurality of windings, certain of said windings being subjected by said coupling device to current from said battery and being disconnected from said battery by response of said means and other of said windings being subjected to current from said charging circuit to maintain said means effective to complete said charging circuit.

5. In combination, a storage battery, a charging circuit therefor, a device for coupling the terminals thereof and electro-responsive means normally interrupting said charging circuit and responsive to complete said circuit upon coupling of the battery thereto, said means including a circuit controlling device having an operating winding to be subjected by said coupling device to current from said battery and a holding winding to be subjected to current from said charging circuit and acting to interrupt the circuit of said operating winding.

6. In combination, a storage battery, a charging circuit therefor, a device for coupling the terminals thereof and electro-responsive means normally interrupting said charging circuit and responsive to complete said circuit upon coupling of the battery thereto, said means including a circuit controlling device having an operating winding to be subjected by said coupling device to current from said battery and a holding winding to be subjected to current from said charging circuit and further including a device for automatically disconnecting the former winding from said battery upon response of said means.

7. In combination, a storage battery, a charging circuit therefor, a device for coupling the terminals thereof, a normally open electro-responsive switch in said charging circuit having an operating winding to be energized by current therefrom and an electro-responsive relay responsive to current supplied from said battery through said coupling device to complete the energizing circuit of said switch.

8. In combination, a storage battery, a charging circuit therefor, a device for coupling the terminals thereof, a normally open electro-responsive switch in said charging circuit having an operating winding to be energized by current therefrom, an electro-responsive relay responsive to current supplied from said battery through said coupling device to complete the energizing circuit of said switch and means for interrupting the battery connections of said relay upon response of said switch and rendering continued energization of said switch independent of said connections.

9. In combination, a storage battery, a charging circuit therefor, a device for coupling the terminals thereof, an electro-responsive switch for normally interrupting said charging circuit and an electro-responsive relay controlling the energizing circuit of said switch, said relay having an operating winding energized by current from said battery and a holding winding in said charging circuit, said switch in responding deenergizing the operating winding of said relay.

In witness whereof, I have hereunto subscribed my name.

ALBERT J. HORTON.